Dec. 19, 1961 S. L. LEACH 3,013,468

THREE DIMENSIONAL MOTION PICTURE CAMERA

Filed April 20, 1953 8 Sheets-Sheet 1

INVENTOR

SAM L. LEACH

BY Jacobi & Jacobi

ATTORNEYS

Dec. 19, 1961 S. L. LEACH 3,013,468

THREE DIMENSIONAL MOTION PICTURE CAMERA

Filed April 20, 1953 8 Sheets-Sheet 2

INVENTOR

SAM L. LEACH

BY Jacobi & Jacobi

ATTORNEYS

THREE DIMENSIONAL MOTION PICTURE CAMERA

Filed April 20, 1953 8 Sheets-Sheet 3

INVENTOR

SAM L. LEACH

BY

Jacobi & Jacobi

ATTORNEYS

INVENTOR
SAM L. LEACH
BY Jacobi & Jacobi
ATTORNEYS

THREE DIMENSIONAL MOTION PICTURE CAMERA

Filed April 20, 1953 8 Sheets-Sheet 5

INVENTOR

SAM L. LEACH

BY Jacobi & Jacobi

ATTORNEYS

Dec. 19, 1961 S. L. LEACH 3,013,468

THREE DIMENSIONAL MOTION PICTURE CAMERA

Filed April 20, 1953 8 Sheets-Sheet 6

INVENTOR

SAM L. LEACH

BY Jacobi & Jacobi

ATTORNEYS

THREE DIMENSIONAL MOTION PICTURE CAMERA

Filed April 20, 1953 8 Sheets-Sheet 7

INVENTOR
SAM L. LEACH
BY
Jacobi & Jacobi
ATTORNEYS

Dec. 19, 1961 S. L. LEACH 3,013,468

THREE DIMENSIONAL MOTION PICTURE CAMERA

Filed April 20, 1953 8 Sheets-Sheet 8

INVENTOR
SAM L. LEACH

BY Jacobi & Jacobi
ATTORNEYS 3,013,468

THREE DIMENSIONAL MOTION PICTURE CAMERA

Sam L. Leach, Nashville, Tenn., assignor to Moving Picture Research Corporation, New York, N.Y., a corporation of Tennessee Filed Apr. 20, 1953, Ser. No. 349,677
10 Claims. (Cl. 88—16.6)

Figure 1:
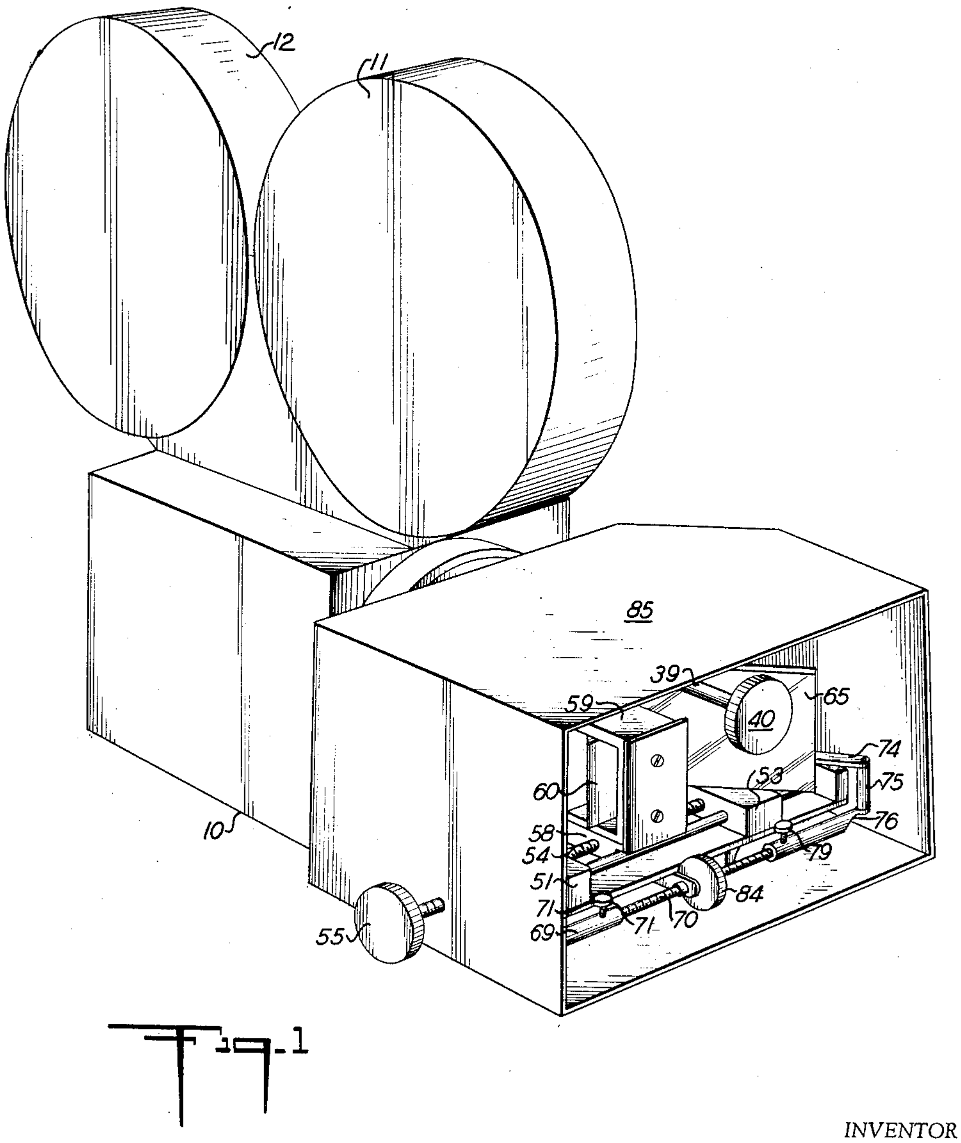

This invention relates to photography and more particularly to a camera for exposing sensitized film in such a manner that projection of images therefrom, to a specially designed screen will provide three dimensional motion pictures. Conventional moving picture projectors may be used for projecting this film, the only special apparatus required in the theater or other viewing location, being a special screen. Such screen however, forms no part of this invention and will only be mentioned in order to properly describe the system utilized for providing three dimensional motion pictures.

Heretofore various methods and systems for producing three dimensional motion pictures have been proposed and tested experimentally, but these have not been entirely satisfactory, some of the difficulties being technical, undue complexity and inconvenience to the viewing audience. Many of these prior systems have required the use of an excess number of extremely expensive cameras and have likewise, required the installation of large quantities of expensive additional equipment, such as extra projectors and special screens in theaters and in some instances have required that each person in the viewing audience wear specially designed glasses. Needless to say the above mentioned defects have seriously impeded the development and commercialization of three dimensional motion pictures, and it is only in recent years that a determined effort has been made to provide such motion pictures in other than experimental installations.

Probably the most promising presently known system for providing three dimensional motion pictures is one which may be carried out in several ways, one such way being the use of a beam splitting device which permits exposure of one-half of a film frame by light from the right hand view of the scene to be photographed and exposure of the other half of the film frame by light from the left hand view of the scene. In this case, the right and left hand images occupy the space in a film frame normally entirely filled by a single image. This version of the system is not entirely satisfactory for professional use, since when the two views are projected for viewing on a theater screen, the resulting picture is out of proportion, in that it is tall and narrow.

Another method of utilizing the above system involves providing alternate right and left hand images on a single strip of film, or in other words, one frame would be a left hand view of the scene to be photographed, the next frame a right hand view of the scene, the next frame a left hand view of the scene etc. This method requires that the camera mechanism operate at twice normal speed and also requires that the theater projector operate at twice normal speed. Continuous operation at this speed is somewhat impractical, due to excessive wear and vibration, but more important, seriously complicates the exposure problem. This problem is particularly serious when utilizing color film which is relatively slow.

It has been found that the most practical method of providing three dimensional motion pictures utilizing the above system is by exposing two entirely separate strips of film in absolute synchronism. This may be accomplished in one specially designed camera, or two cameras may be utilized which operate in exact synchronism. Of course, in this version of the system, one film would contain only pictures of the left hand view of the scene to be photographed and the other film would contain only pictures of the right hand view. Furthermore, in this version it is necessary to utilize two projectors operating in exact synchronism and probably the most serious problem is the fact that each person in the viewing audience must wear glasses containing special lenses which separate the left and right images for the viewer's eyes appearing on the theater screen, thus giving a three dimensional effect.

Obviously, the above described system in its several aspects introduces many technical problems which are difficult and costly to overcome and likewise, the use thereof results in a very considerable investment by theaters for equipment such as special glasses which are likely to be carried away by the audience, to say nothing of the personal inconvenience and discomfort occasioned by the necessity for wearing such glasses.

Stereo photography or the production of three dimensional still pictures by utilizing a lenticular screen is well known and has been accomplished by moving the camera physically through a controlled excursion during the exposure, or by utilizing a series of prisms built into the optical system of the camera. In this latter case, each prism is permanently and accurately positioned to transmit an image directly to one minute section of the lenticular screen which is positioned directly in front of the emulsion plane of the film. This arrangement requires the use of approximately sixteen prisms which must be positioned very accurately to transmit the proper number of right and left images to the proper portions of the lenticular screen. This system also prohibits variations of depth or dimension without physically rebuilding the camera and furthermore, results in the provision of a fixed focus camera which is impractical and undesirable. This means that the camera has a fixed parallax and focus and if used to photograph a scene in which some elements of the scene are beyond the limits established by the fixed parallax then the resulting picture cannot be converged by the viewing screen and spectator, thus resulting in double images and acute uncomfortable eye strain.

Briefly stated the system utilized by the present invention includes a moving picture camera provided with spaced mirrors adjustable toward and from each other, these mirrors viewing a scene to be photographed much in the same manner as the eyes of a person. Disposed midway between these mirrors is a prism which serves to transmit light rays reflected by such mirrors through a rotating shutter and into a focusing objective lens system. From the objective lens system the light rays travel to a lenticular screen which is mounted for reciprocatory movement at right angles to the axis of the objective lens system, this screen being located at the proper distance from the emulsion plane of a film which is fed by conventional film feeding mechanism at any desired speed, such as twenty-four frames per second.

As stated above, the mirrors are adjustable toward or from each other in order to vary the interoccular separation of the optical system thereby adjusting the parallax and maintaining an optical balance between the right and left hand images received by the two mirrors.

Since the two mirrors each transmit a single picture only, it is essential that the lenticular screen move through an excursion during the exposure, to allow the line focus of the screen to be extended to the limits prescribed by the dimensions of the lenticles making up the screen. In this application the term lenticle is used to define each lens of the lenticular screen. This excursion or reciprocatory movement of the lenticular screen must be in absolute synchronism with the rotation of the shutter which results in transmitting left and right hand views alternately. In other words, as the shutter opens to permit transmission of the left hand view to the lenticular screen and to the film, the movement of the screen must be at exactly the correct speed to permit proper exposure of the emulsion in accordance with the speed of the shutter which has been predetermined in accordance with known factors such as illumination film speed etc.

When the shutter reaches the exact mid-point of the exposure of a single frame, this means that the left hand view must be complete and if the excursion of the lenticular screen at this time is less than or greater than, one-half the width of a single lenticle than the synchronism between the shutter and the lenticular screen is not exact and the picture is inaccurate. Assuming that the synchronism is exact and that the lenticular screen travels exactly one-half the width of a lenticle during exposure of the emulsion by light from the left hand mirror, the remainder of the travel of the lenticular screen in the same direction will properly expose the emulsion by light from the right hand mirror.

One frame of the film is exposed during the complete movement of the lenticular screen in one direction and the next frame is exposed during the return movement of the lenticular screen. This results in exposing one frame in left right, left right order and the next frame in right left, right left order. This prevents obtaining pseudoscopic views alternating with stereoscopic views, each of which would cancel the other resulting in a flat picture when projected.

The above represents all of the apparatus which is necessary to provide a film capable of use in projecting three dimensional motion pictures and in order to utilize the same in a theater, or other desired location, it is only necessary to project the same from a conventional motion picture projector to a lenticular screen designed for that theater or other location and having the same number of lenticles as the screen in the camera.

It is accordingly an object of this invention to provide a camera for exposing sensitized film capable of use in projecting three dimensional motion pictures in which it is only necessary to utilize one film and in which means is provided to adjust the interoccular separation of the optical system, thereby controlling the depth of the picture.

A further object of the invention is the provision of a camera for exposing sensitized film capable of use in projecting three dimensional motion pictures including means for exposing the film in such a manner, that contiguous alternate left and right images are reproduced thereon, in one frame and contiguous alternate right and left images reproduced in the next frame with the images in one frame in exact alignment with the images in the next frame.

A still further object of the invention is the provision of a camera for exposing sensitized film capable of use in projecting three dimensional motion pictures and incorporating a reciprocating lenticular screen which operates in timed relation with a rotary shutter for alternately transmitting right and left hand images to the film to expose the same.

Another object of the invention is the provision of a camera for exposing sensitized film capable of use in projecting three dimensional motion pictures in which means for receiving right and left hand images, and for transmitting the same to the film in alternate continuous vertical strips, may be incorporated in a conventional motion picture camera without interfering with the conventional film feeding mechanism or with the conventional focusing means.

A further object of the invention is the provision of a three dimensional motion picture system requiring only a single camera, a single film, and a special screen a single projector.

A still further object of the invention is the provision of a rotary shutter for use in a three dimensional motion picture camera, such shutter including means for permitting exposure of a film by light rays from a scene to be photographed in left right, right left, left right, right left sequence.

Another object of the invention is the provision of a shutter for use in a three dimensional motion picture camera including means for adjusting the extent of the apertures in the shutter, as well as means for adjusting the shutter angularly with respect to the shaft on which it is mounted.

A further object of the invention is the provision of a lenticular screen and the mounting therefor, for use in a three dimensional motion picture camera, which mounting permits reciprocatory movement of the screen in synchronism with the rotation of the camera shutter.

A still further object of the invention is the provision of a single exposed film capable of use in projecting three dimensional motion pictures.

Figure 2:
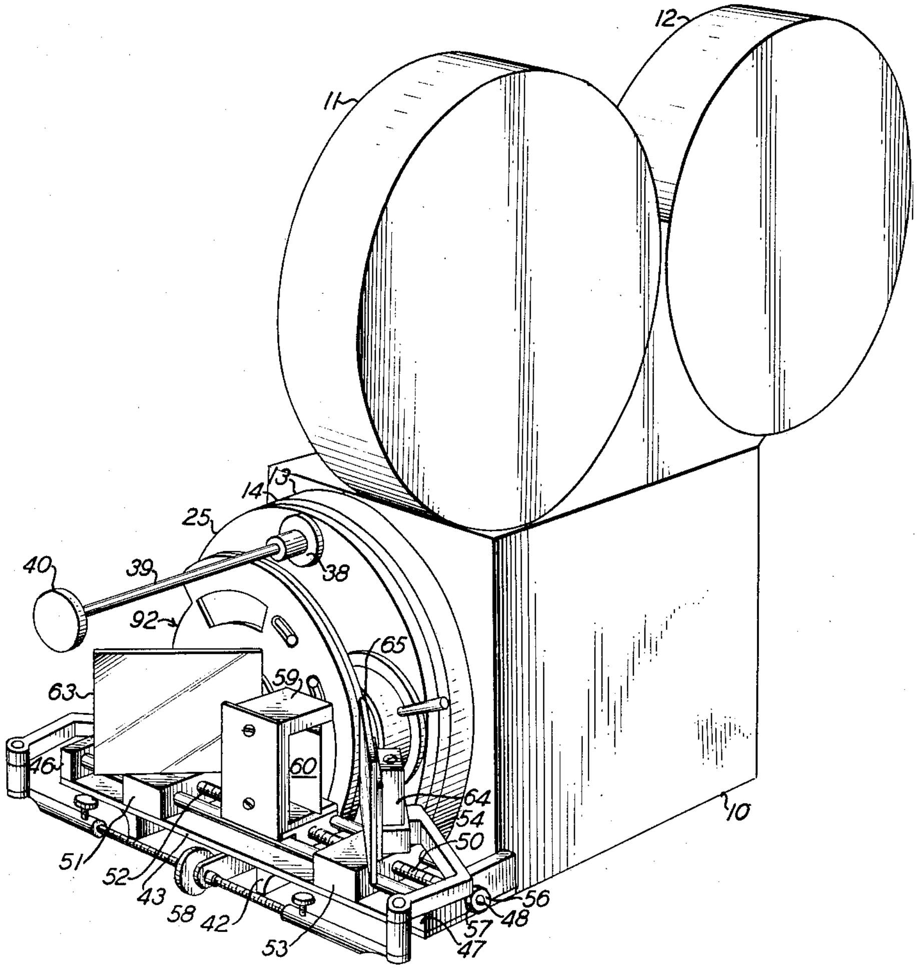
Figure 3:
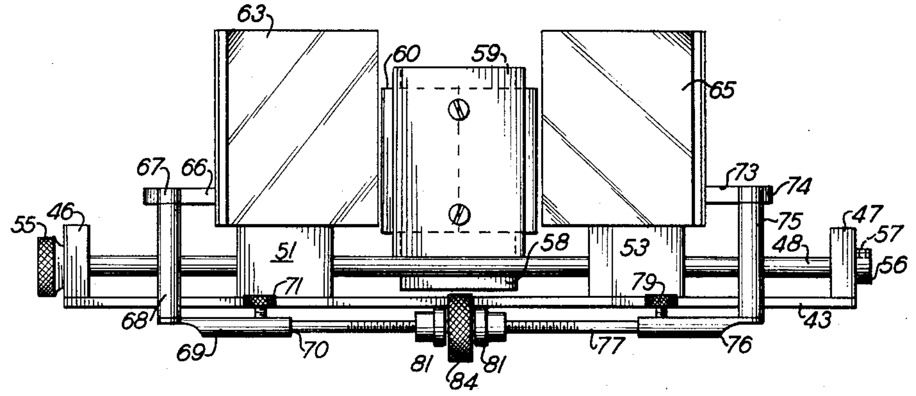
Figures 4, 5:
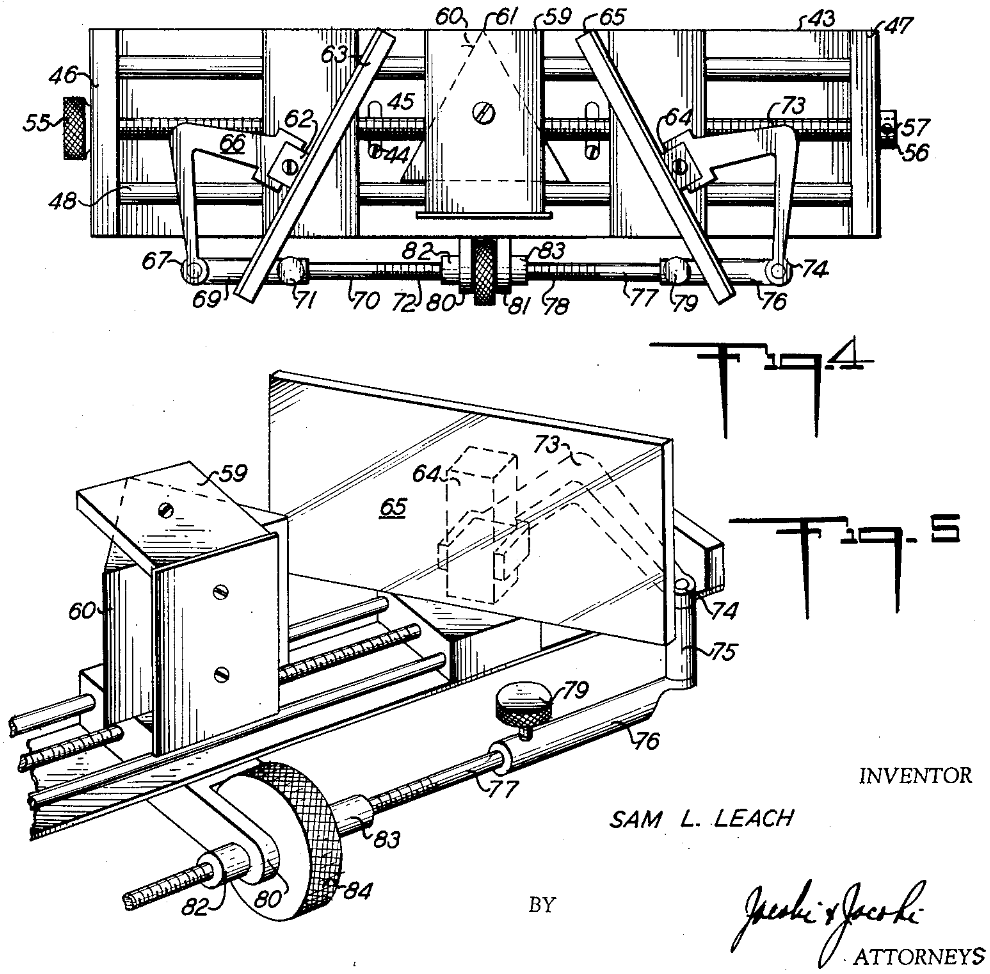
Figures 6, 7, 19, 20:
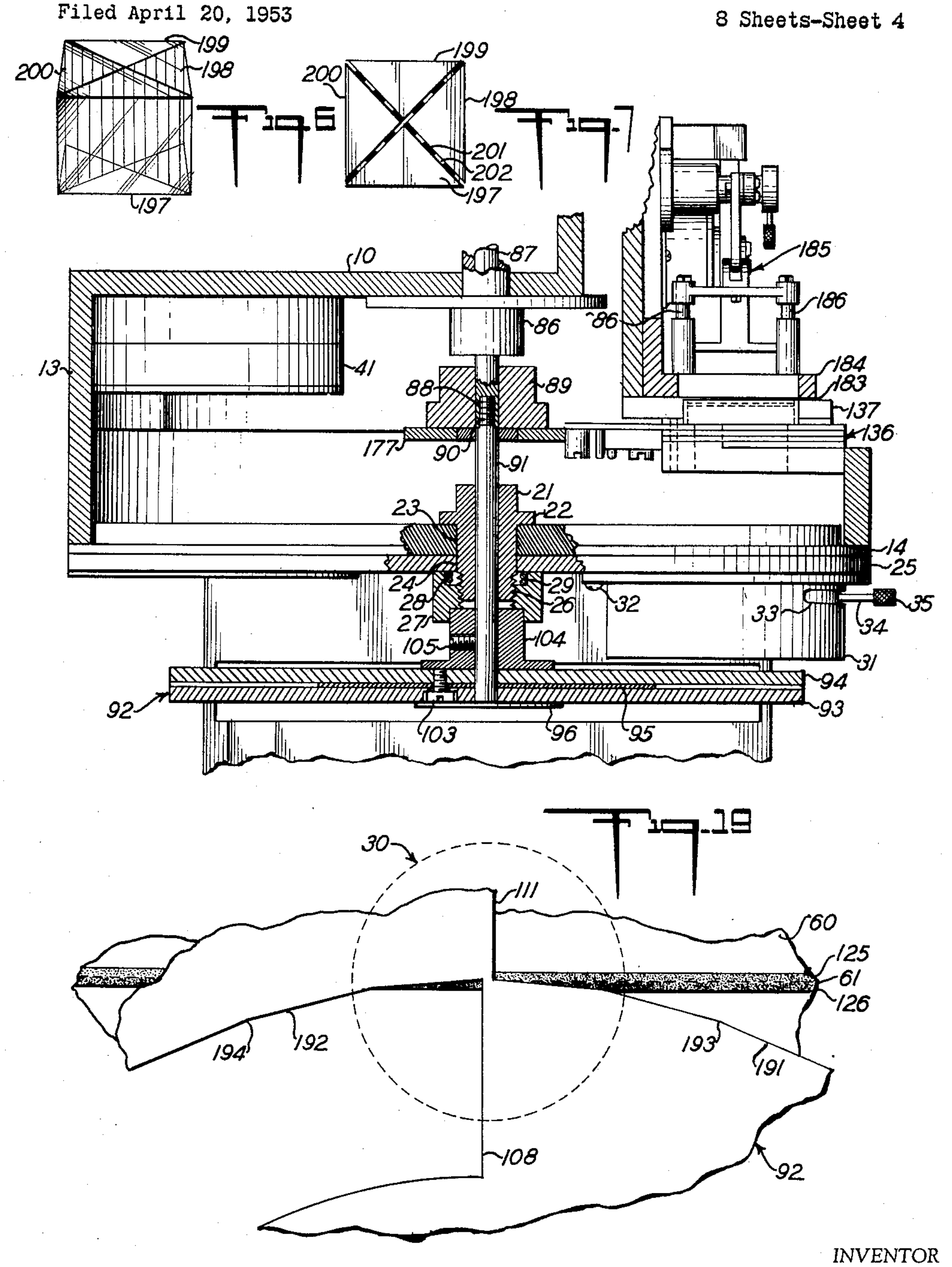
Figure 8:
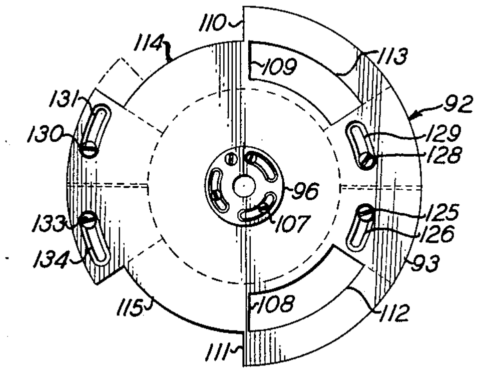
Figure 9:
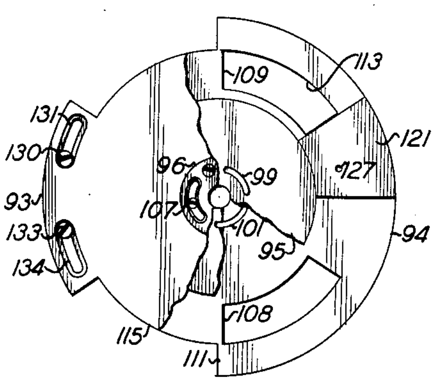
Figure 10:
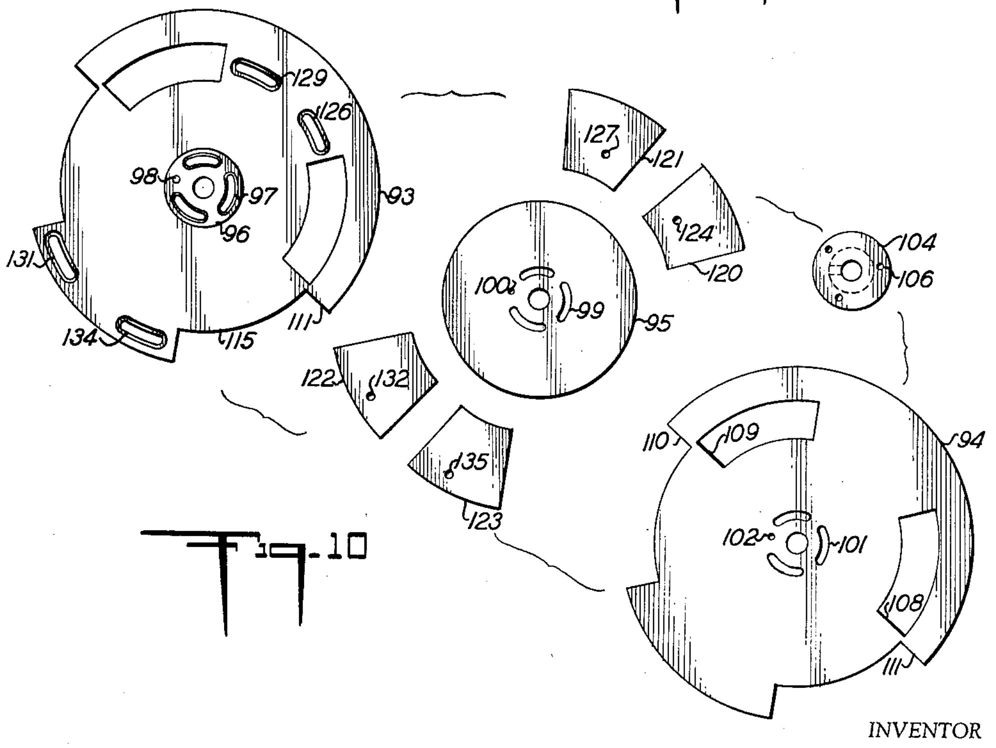
Figure 11:
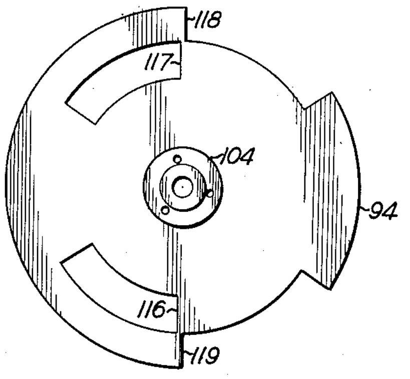
Figure 12:
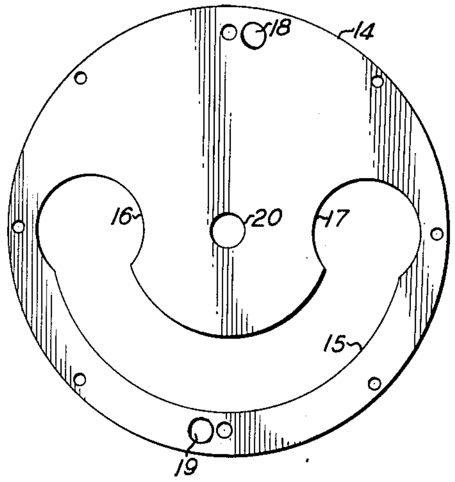
Figure 13:
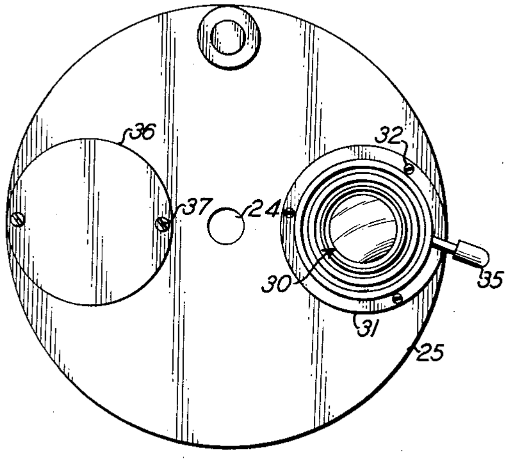
Figure 14:
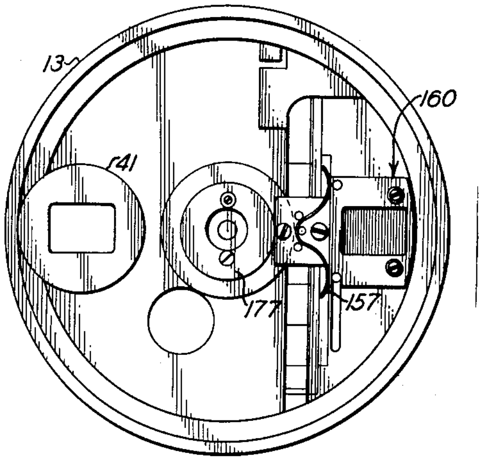
Figures 15, 16, 17, 18:
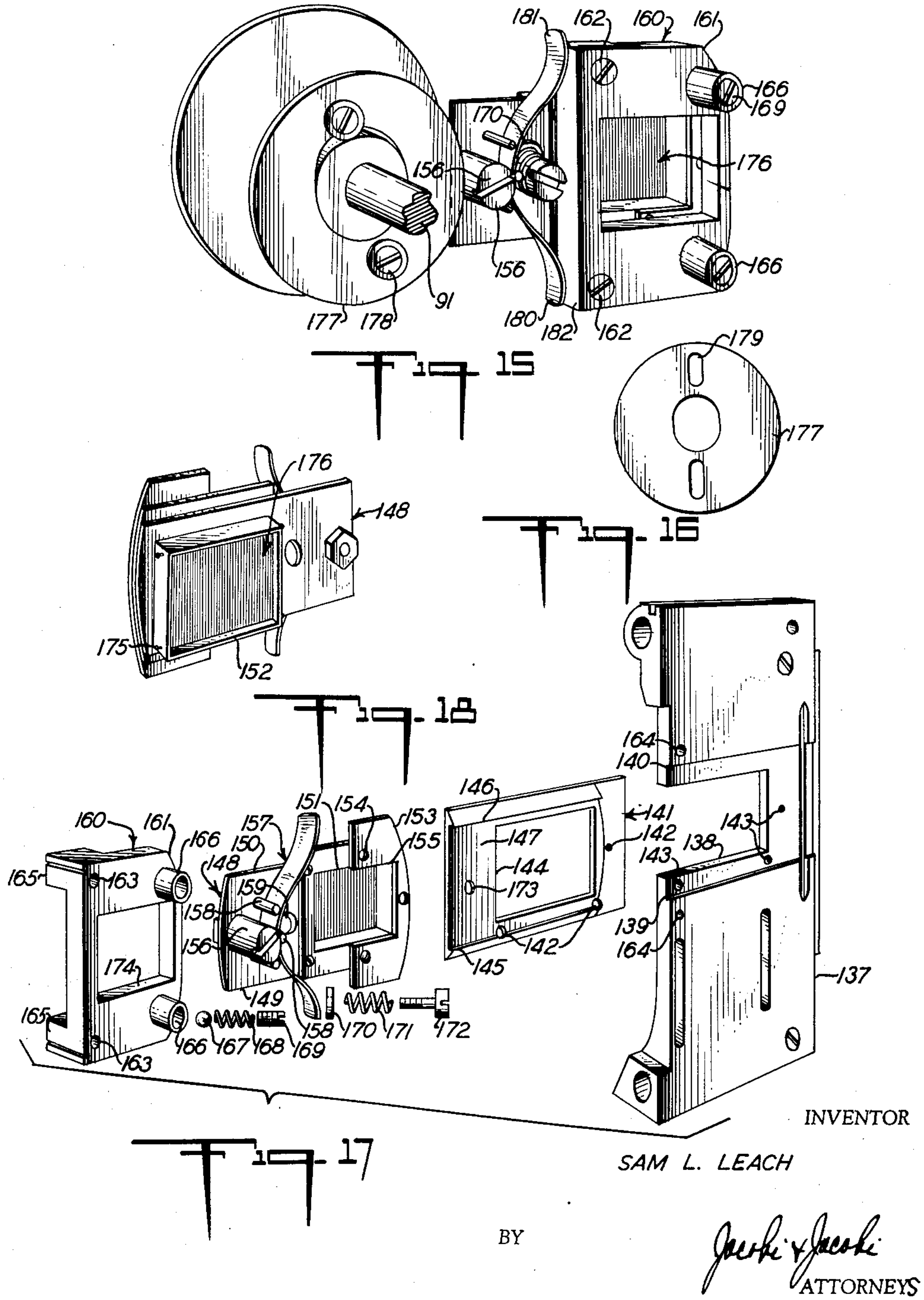
Figures 21, 22, 23, 24:
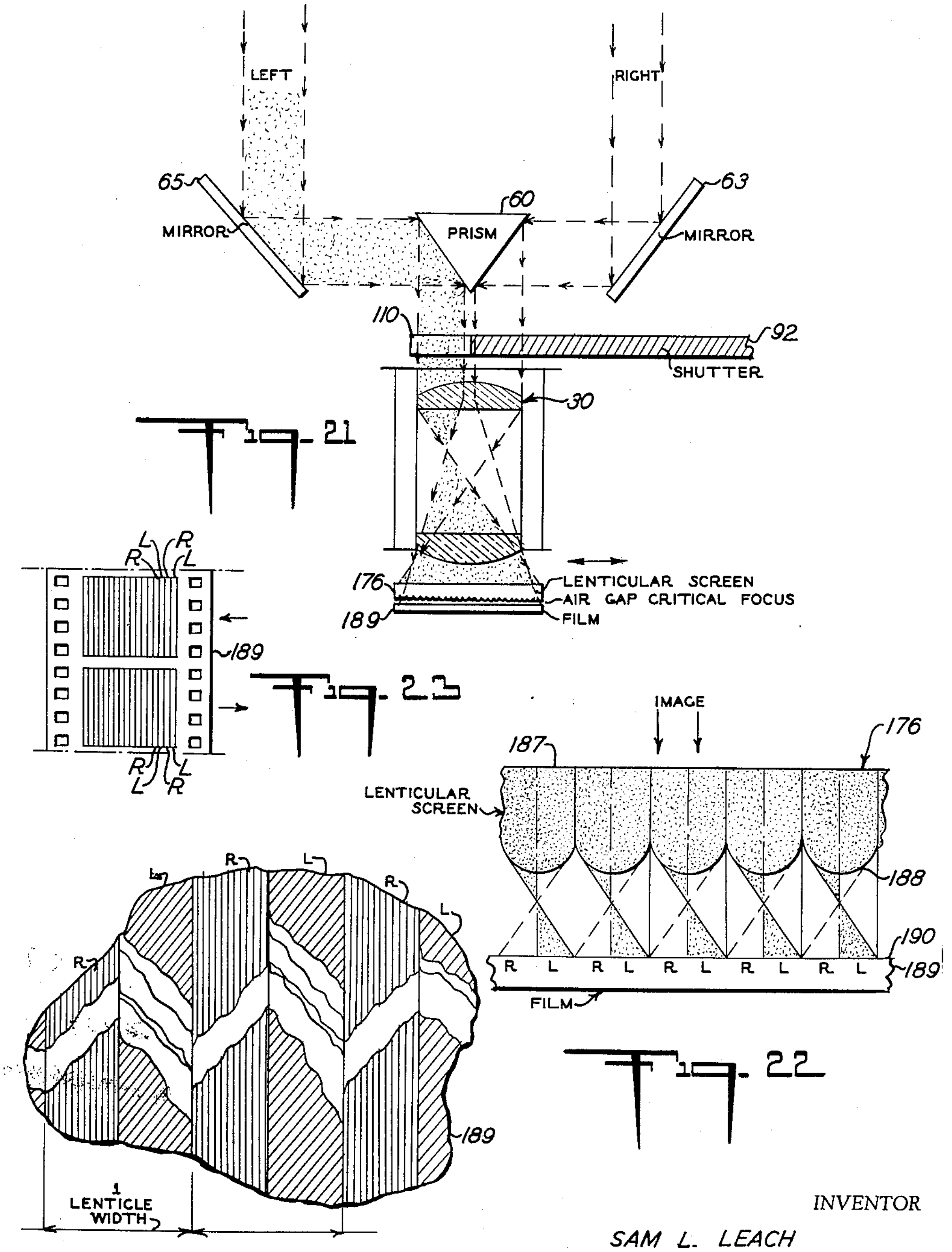

Further objects and advantages of the invention will be apparent from the following description taken in conjunction with the accompanying drawings wherein:

FIG. 1 is a perspective view of a camera constructed in accordance with the present invention and with the mirror protecting hood and light shield in place;

FIG. 2, a perspective view similar to FIG. 1, but taken from the opposite side and with the protective hood removed;

FIG. 3, a front elevational view of the mirror and prism assembly together with the adjustable mounting for the mirrors;

FIG. 4, a top plan view of the mirror and prism assembly shown in FIG. 3;

FIG. 5, a fragmentary perspective view of the mirror and prism assembly and showing particularly the means for adjusting the angularity of the mirrors;

FIG. 6, a perspective view of a bar type reflector which may be utilized in place of the prism shown in FIG. 3;

FIG. 7, a top plan view of the bar type reflector shown in FIG. 6;

FIG. 8, a front elevational view of the shutter utilized in the camera of this invention;

FIG. 9, a view similar to FIG. 8, but with parts broken away for greater clarity;

FIG. 10, an exploded view of the parts incorporated in the shutter shown in FIG. 8;

FIG. 11, a rear elevational view of the shutter shown in FIG. 8;

FIG. 12, a front elevational view of the mounting plate for securing the objective lens to the camera;

FIG. 13, a front elevational view of the objective lens mounting plate;

FIG. 14, a front elevational view showing the mounting of the reciprocating lenticular screen with relation to the shutter shaft and focusing aperture;

FIG. 15, a fragmentary perspective view showing the reciprocating lenticular screen and the cam mounted on the shutter shaft for moving the screen;

FIG. 16, a front elevational view of the screen actuating cam;

FIG. 17, an exploded perspective view of the parts incorporated in the lenticular screen assembly and the mounting means therefor;

FIG. 18, a rear perspective view of a portion of the lenticular screen assembly;

FIG. 19, a fragmentary sectional view showing the relationship of the shutter, the objective lens system, the reciprocating lenticular screen and the film feeding mechanism;

FIG. 20, a fragmentary, front elevational view to an enlarged scale of a modified form of shutter and showing its relationship to the prism and objective lens;

FIG. 21, a diagrammatic view showing the optical system incorporated in the camera of this invention and the paths traveled by the light rays;

FIG. 22, a fragmentary diagrammatic view to an enlarged scale showing the lenticular screen utilized in the camera of this invention and the relationship of such screen to the film;

FIG. 23, a view to an enlarged scale of two frames of a film resulting from exposure in the camera of this invention; and FIG. 24, a fragmentary view to an enlarged scale showing the relationship of the right and left hand images in one frame of an exposed film.

With continued reference to the drawing there is shown in FIGS. 1 and 2, a motion picture camera having a housing 10 within which is contained the mechanism for operating the shutter as well as the conventional film feeding mechanism. Mounted on the housing 10 are film magazines 11 and 12 which are adapted to receive reels of unexposed and exposed film.

Extending forwardly of the front wall of the housing 10 is a cylindrical housing 13 to the forward end of which is attached a closure plate 14. As shown in FIG. 12 the closure plate 14 is provided with an arcuate slot 15 terminating at one end in a circular aperture 16 and at the opposite end in a circular aperture 17. The purpose of this slot and apertures will be presently described. Closure plate 14 is also provided with diametrically disposed apertures 18 and 19, the purpose of which will presently appear.

With particular reference to FIGS. 12 and 19, the closure plate 14 is provided with a central aperture 20 which serves to receive an elongated bushing 21. Bushing 21 is provided with an annular flange 22 which abuts the rear surface of the closure plate 14 and the bushing 21 is also provided with a cylindrical surface 23, extending through the aperture 20 in the closure plate 14, this cylindrical surface 23 serving to extend through an aperture 24 in a lens mounting plate 25. The cylindrical surface 23 of the bushing 21 terminates in a screw threaded portion 26 which serves to receive a nut 27. Nut 27 is provided with an annular recess 28 within which is disposed a compression spring 29, this spring engaging the front surface of the lens mounting plate 25 and retaining the same rotatably mounted on the cylindrical surface 23 of the bushing 21.

As best shown in FIGS. 13 and 19 lens mounting plate 25 serves to receive and support an objective lens system 30 which is mounted in a housing 31 secured to the front face of the lens mounting plate 25 by screw threaded fastening means or the like 32. Extending from the side of the housing 31 through a slot 33 is an arm 34 having a finger engaging knob 35 thereon to permit convenient focusing of the objective lens system 30. The lens mounting plate 25 may also be provided with an aperture covered by a plate 36 removably secured in place by screw threaded fastening means or the like 37 and if desired the plate 36 may be removed and a second objective lens system having different optical characteristics attached, which second lens system may be selectively utilized instead of the lens system 30.

Referring to FIGS. 2, 12, 13 and 19, the lens mounting plate 25 may be provided adjacent the periphery thereof, with a bushing 38 within which is slidably mounted a locking plunger 39. Plunger 39 may be spring urged inwardly by means not shown, the inner end of the plunger 39 being receivable in either the aperture 18 or the aperture 19 in closure plate 14 to prevent rotation of the lens mounting plate 25 relative to the closure plate 14 and the plunger 39 may be provided on its forward end with a finger engaging knob 40 to facilitate convenient manipulation thereof.

With the plunger 39 received in the aperture 18 in the closure plate 14, the objective lens system 30 will be in the position shown in FIG. 2, and in this position light rays will pass through the lens system 30 and the circular aperture 17 at one end of arcuate slot 15 to permit exposure of the film within the housing 10. When it is desired to focus the lens system 30 prior to exposure of the film, the plunger 39 is withdrawn from the aperture 18 and the lens mounting plate 25 together with the lens system 30 carried thereby, is rotated to a position with the objective lens system 30 in alignment with the circular aperture 16 at the opposite end of arcuate slot 15 and with the plunger 39 received in aperture 19. To the rear of the closure plate 14 within the circular housing 13 there is disposed a viewing mechanism 41 incorporating a ground glass screen which serves to receive an image of the scene to be photographed. Upon completion of the focusing operation the plunger 39 is withdrawn from the aperture 19 in the closure plate 14 and the lens mounting plate 25 and objective lens system 30 carried thereby is rotated to the original position with the plunger 39 engaging in the aperture 18 to lock the objective lens system 30 in position for taking pictures.

Extending forwardly of the housing 10 and secured thereto is a bracket 42 which serves to support an elongated base plate 43 secured to the bracket 42 by screw threaded fastening means or the like 44 extending through slots 45 in the base plate 43. Mounted on the base plate 43 adjacent each end thereof, are blocks 46 and 47 which serve to rotatably receive a shaft 48 and to support guide rods 49 and 50. As best shown in FIGS. 2, 3, 4 and 5, a right hand slide block 51 is slidably mounted on rods 49 and 50 and is provided with a screw threaded aperture having right hand threads engaging right hand threads 52 on the shaft 48. Also, slidably mounted on rods 49 and 50 is a left hand slide block 53 having an aperture provided with left hand threads engaging left hand threads 54 on the shaft 48. Shaft 48 is provided at one end with a finger engaging knob 55 to permit convenient rotation thereof, and at the opposite end with a collar 56 having a set screw 57 for retaining the collar 56 in place on the shaft 48 and in engagement with the outer surface of block 47. Collar 56 and finger engaging knob 55 serve to retain the shaft 48 against endwise movement in the blocks 46 and 47.

Midway of the ends of base plate 43 is a base block 58 secured to the base plate 43 and rods 49 and 50 as well as, shaft 48 pass through this base block 58. Mounted on the upper surface of base block 58 is a U-shaped bracket 59 and secured within this bracket in any suitable manner between the legs thereof, is a prism 60. The apex 61 of the prism 60 is directed toward the rear of the camera and is substantially in alignment with the axis of the objective lens system 30 when such system is in the position shown in FIG. 2.

Pivotally mounted on right hand slide block 51 for movement about a vertical axis is an upstanding post 62 on which is mounted a right hand plane mirror 63. Mirror 63 is so positioned that light rays from in front of the camera will be reflected to one face of the prism 60. Pivotally mounted on left hand slide block 53 for movement about a vertical axis is an upstanding post 64, this post serving to support a left hand plane mirror 65 which is so positioned as to receive light rays from forwardly of the camera and reflect the same to the opposite face of the prism 60.

Mirrors 63 and 65 are simultaneously movable toward or away from the prism 60 by rotation of the shaft 48 and this serves to vary the interocular separation of the optical system in accordance with the distance from the camera to the scene to be photographed. This simultaneous movement of the mirrors 63 and 65 also operates to maintain an optical balance in the optical system.

Since it is desirable that the parallax of the optical system be adjustable in accordance with the distance of the scene to be photographed from the camera, mechanism is provided to permit simultaneous adjustment of the mirrors 63 and 65 in order to change the angular relationship of such mirrors. This mechanism may well take the form of an arm 66 secured at one end to the post 62 and with the opposite end 67 extending forwardly of the base plate 43. To the end 67 of arm 66 there is attached a downwardly extending rod 68 to the lower end of which is pivotally attached a sleeve 69. Sleeve 69 serves to slidably receive one end of a rod 70 and the sleeve 69 may be provided with a set screw 71 or other suitable means in order to lock the rod 70 in any desired position in the sleeve 69. The opposite end of rod 70 is provided with right hand screw threads 72.

Similarly an arm 73 is secured at one end to the post 64 and the opposite end 74 of arm 73 extends forwardly of base plate 43. Secured to the end 74 of arm 73 is a downwardly extending rod 75 to the lower end of which is pivotally attached a sleeve 76. Sleeve 76 serves to slidably receive one end of a rod 77, the opposite end of which is provided with left hand screw threads 78. Sleeve 76 is provided with a set screw 79 or other suitable means, to lock the rod 77 in adjusted position in the sleeve 76.

Secured to the base plate 43 and extending forwardly therefrom are spaced ears 80 and 81 in which is journalled an elongated double ended nut having one end 82 provided with right hand threads and engaging the right hand threads 72 on rod 70 and the opposite end 83 having left hand threads engaging the left hand threads 78 on rod 77. A finger engaging knob 84 is positioned between the ears 80 and 81 and is secured to the elongated double ended nut in order to facilitate convenient rotation of the same.

It will be seen from an inspection of FIGS. 2, 3, 4, and 5 that upon tightening of the set screws 71 and 79 to lock the rods 70 and 77 in the sleeves 69 and 76, and upon rotation of the finger engaging knob 84, that the ends 67 and 74 of the arms 66 and 73 respectively, will be moved toward or from each other in order to cause pivotal movement of the posts 62 and 64 and thus change the angularity of the right and left hand mirrors 63 and 65 carried thereby. Release of the set screws 71 and 79 to permit free sliding movement of the rods 70 and 77 within the sleeves 69 and 76 respectively will permit movement of the sliding blocks 51 and 53 and of mirrors 63 and 65 carried thereby toward or from each other upon rotation of the shaft 48 without changing the angular relationship of the mirrors.

It will be seen that by the above described mechanism there has been provided means to vary the interoccular separation of the optical system and also independently operable means to vary the parallax of such system in order to provide the proper separation and angle of convergence in accordance with the distance from the camera of the scene to be photographed.

Since it is desirable that the mirrors 63 and 65, the prism 60 and associated mechanism be protected against injury and further since it is desirable that light be admitted to the mirrors 63 and 65 only from the front of the camera and that all other extraneous light be excluded, a protective hook 85, as shown in FIG. 1, is attached to the base plate 43 carried by the bracket 42, the hood 85 extending forwardly of the mirrors 63 and 65 and being rotatable with the mirror assembly and lens system during focusing operations.

Extending from within the housing 10 through a bearing 86 in the front wall thereof, is a rotatable shutter shaft 87 provided in its forward end with a threaded socket 88. Secured to the shaft 87 adjacent the forward end thereof, is a hub 89, the purpose of which will be later described. Received within the threaded socket 88 is the threaded end 90 of a shutter shaft extension 91 which extends through bushing 21 and terminates forwardly of the housing 31 of objective lens system 30. A rotating shutter 92 is secured to the shutter shaft extension 91 for rotation therewith and the structure of the rotating shutter 92 will now be described.

With particular reference to FIGS. 2, 8, 9, 10, 11 and 19 the shutter 92 comprises a front disc 93 and a rear disc 94 spaced therefrom. A spacer disc 95 is disposed between the discs 93 and 94 centrally thereof, and a spider 96 is secured to the front face of the disc 93. Spider 96 is provided with a plurality of arcuate slots 97 and with an aperture 98 the purpose of which will be presently described. Spacer disc 95 is provided with a plurality of arcuate slots 99 and an aperaure 100, these slots and apertures being in alignment with the slots 97 and aperture 98 in the spider 96. The rear disc 94 is provided with a plurality of arcuate slots 101 and a threaded aperture 102 for threadedly receiving a screw 103 extending through the aperture 98 in the spider 96 and through the aperture 100 in the spacer disc 95. Tightening of the screw 103 serves to securely clamp the front and rear discs 93 and 94 and the spacer disc 95 in assembled relationship. A hub 104 is fixed on the shutter shaft extension 91 by a set screw or other suitable means 105 and the hub 104 is provided with a plurality of threaded apertures 106 for threadedly receiving screws 107 extending through the arcuate slots 97, 99 and 101 in the front disc 93, spacer disc 95 and rear disc 94, in order to secure the shutter assembly to the hub 104 and shutter shaft extension 91 and permit angular adjustment of the shutter assembly 92 with relation to the shutter shaft extension 91.

The front disc 93 is provided with an arcuate slot 108, a second arcuate slot 109, an arcuate notch 110 and a second arcuate notch 111. Arcuate slot 108 is diametrically opposite arcuate notch 110 and arcuate slot 109 is diametrically opposite arcuate notch 111. The outer edge 112 of arcuate slot 108 and the outer edge 113 of the arcuate slot 109 are of substantially the same radius as the inner edge 114 of arcuate notch 110 and the inner edge 115 of arcuate notch 111. The rear disc 94 is also provided with arcuate slots 116 and 117 in alignment with the arcuate slots 108 and 109 and with arcuate notches 118 and 119 in alignment with the arcuate notches 110 and 111.

Means is provided to vary the length of the arcuate slots and notches in the form of slidable leaves 120, 121 and 122 and 123 disposed between the front and rear discs 93 and 94 adjacent one end of the slots and notches. Leaf 120 is provided with a threaded aperture 124 for threadedly receiving a screw 125 disposed in an arcuate slot 126 in the front disc 93 and leaf 121 is provided with a threaded aperture 127 for threadedly receiving a screw 128 disposed in an arcuate slot 129 in the front disc 93. Leaf 120 may be slidably moved into the arcuate slot 108 in order to adjust the length thereof, and be locked in position by tightening the screw 125. Similarly leaf 121 may be moved into the arcuate slot 109 to vary the length thereof and be locked in adjusted position by tightening the screw 128.

The length of arcuate notch 110 may be varied by moving the leaf 122 to the desired position and locking the same in place by tightening a screw 130 disposed in an arcuate slot 131 in front disc 93 and threadedly engaging an aperture 132 in the leaf 122. The leaf 123 may in a like manner be moved into the arcuate notch 111 to vary the length thereof, and be locked in adjusted position by tightening a screw 133 disposed in an arcuate slot 134 in the front disc 93 and threadedly engaging an aperture 135 in the leaf 123.

Mounted within the housing 10 to the rear and in line with the objective lens system 30 is a reciprocating lenticular screen assembly 136. This assembly is best described with reference to FIGS. 14 and 19 inclusive. A base plate 137 is secured within the housing 10 by any suitable means and the base plate 137 is provided with a rectangular transverse opening 138. The base plate 137 is recessed on each side of the opening 138 to provide shoulders 139 and 140 between which are received with a snug fit a slide plate 141 which may be secured in position by screw threaded fastening means or the like, extending through apertures 142 and threadedly engaging apertures 143 provided in the base plate 137.

Slide plate 141 is provided with a rectangular aperture 144 and extending from the slide plate 141 on opposite sides of the aperture 144 are elongated guides 145 and 146. These guides 145 and 146 may be formed integrally with the slide plates 141 or may be provided as separate elements secured thereto by any suitable means.

Slidably mounted between the guides 145 and 146 and in engagement with the front face 147 of the slide plate 141 is an elongated slide 148, the longitudinal edges 149 and 150 of which engage the inner surfaces of the guides 145 and 146 with a snug sliding fit. Slide 148 is provided with a rectangular opening 151 and to the rear surface of the slide 148 there is secured a frame 152 surrounding the rectangular opening 151. A pressure plate 153 is secured to the front face of the slide 148 by screw threaded fastening means or the like 154, and the pressure plate 153 is provided with a notch 155 in alignment with the rectangular opening 151. Also secured to the slide 148 and extending forwardly thereof, is a cam follower 156, the function and operation of which will be presently described. A curved leaf spring 157 is attached adjacent its midpoint to the slide 148 by forwardly extending pins 158 although other equivalent fastening means may be utilized. The slide 148 is also provided with a clearance hole 159, the function of which will presently appear.

The slide 148 is retained in the slideway formed by guides 145 and 146 on the slide plate 141 by a clamping member 160 having a portion 161 overlying the pressure plate 153, the clamping member 160 being secured to the base plate 137 by screw threaded fastening means or the like 162 extending through apertures 163 in the clamping member 160 and threadedly engaging apertures 164 in the base plate 137. Clamping member 160 is provided with inwardly extending projections 165 which abut the front surface of base plate 137 and space the clamping member 160 forwardly thereof, in order to provide sufficient clearance for accommodating the slide 148 and parts associated therewith.

The clamping member 160 is provided with spaced, tubular forwardly extending projections 166 which are internally threaded and which serve to receive an anti-friction ball 167 urged rearwardly by a compression spring 168 held in adjusted position by an adjusting screw 169 threadedly received in the tubular projections 166. The anti-friction balls 167 engage the surface of the pressure plate 153 and hold the slide 148 in firm engagement with the front surface 147 of the slide plate 141, and at the same time permit free reciprocation of the slide 148 in the guides 145 and 146. The slide 148 is further held in position in engagement with the front surface 147 of the slide plate 141 by a washer 170 yieldably engaging the front surface of the slide 148, the washer 170 being urged against the slide 148 by a compression spring 171 held in position by a screw threaded member 172 extending through the clearance hole 159 in the slide 148 and threadedly engaging an aperture 173 in the slide plate 141.

The clamping member 160 is provided with a rectangular opening 174 in alignment with the rectangular opening 151 in the slide 148, the rectangular aperture 144 in the slide plate 141 and the rectangular transverse opening 138 in the base plate 137. Mounted in the frame 152 by any suitable means such as clamping screws 175 is a lenticular screen 176 the structure of which will be later described.

The slide 148 and lenticular screen 176 carried thereby is moved in one direction in the slideway provided by guides 145 and 146 by a cam 177 which as shown in FIGS. 15 and 19 is secured to the hub 89 on shutter shaft 87 by screw threaded fastening means or the like 178 which extend through slots 179 in the cam 177 and threadedly engage in apertures in the hub 89. The fastening means 178 and slots 179 provide a convenient means for adjusting the throw of cam 177. The surface of cam 177 is in engagement with the cam follower 156 mounted on the slide 148 and such engagement is maintained and the slide 148 moved in the opposite direction from that caused by rotation of the cam 177 by the leaf spring 157, the curved ends 180 and 181 of which engage the edge surface 182 of the clamping member 160. Obviously the travel or excursion of the slide 148 and lenticular screen 146 carried thereby may be varied by appropriate adjustment of the cam 177 radially of the hub 89 and since the shutter 92 may be angularly adjusted with relation to the hub 89 the reciprocation of the lenticular screen 176 will be in exact synchronism with the rotation of the shutter 92.

As shown in FIG. 19 a relatively narrow space 183 is provided between the rear surface of base plate 137 and the front surface of a film backing plate 184. The backing plate 184 serves to retain the film in proper flat position behind the rectangular transverse opening 138 in the base plate 137 and to the rear of the backing plate 184 there is disposed a conventional film feeding mechanism 185 provided with film engaging fingers 186 which upon operation of the film feeding mechanism 185 serve to intermittently feed the film through the camera with each frame thereof, momentarily registering with the rectangular transverse opening 138 in the base plate 137. Since the film feeding mechanism 185 is entirely conventional in every respect further detailed description thereof, is believed unnecessary.

The structure and optical characteristics of a lenticular screen are well known and consequently, it does not appear that a detailed discussion thereof, is necessary or desirable since the screen 176 utilized in the camera of this invention is designed in accordance with well known principles and it is only necessary to provide a screen suitable for the purpose.

The lenticular screen 176 as best shown in FIGS. 21 and 22 may be formed of any suitable material such as glass, or transparent plastic and may be in the form of a rectangular plate having a plane rear surface 187 and a front surface formed by a plurality of lenticles 188 which are in effect elongated, parallel individual lenses. Any desired number of lenticles may be provided in the screen 176 but it has been found that entirely satisfactory results are obtained with a screen having five hundred lenticles. As is well known, each lenticle 188 serves to converge and focus light rays passing therethrough in the form of a narrow line of light at the focal point of each lenticle, the line of light being approximately 1/15 of the width of each lenticle.

As shown in FIGS. 21 and 22 the film 189 which is fed through the camera by the film feeding mechanism 185 is provided with an emulsion surface 190 which is positioned in a plane passing through the focal point of the lenticular screen 176. The distance between the emulsion surface 190 and the lenticular screen 176 is critical and must be accurately maintained in order to provide satisfactory photographic images on the film 189.

The operation of the three dimensional motion picture camera of this invention is best shown in FIGS. 2, 22, 23 and 24 and it will be noted from an inspection of FIG. 2. that the objective lens system 30 is positioned directly behind the shutter 92 with the axis of the lens system substantially in alignment with the inner edges 114 and 115 of the arcuate notches 110 and 111 and the outer edges 112 and 113 of the arcuate slots 108 and 109 in the shutter 92. Directly behind the lens system 30 and in alignment therewith is the lenticular screen 176 and as described above the sensitized film 189 is disposed behind the lenticular screen 176 in proper focus therewith.

Assuming that the shutter 92 rotates in a counter-clockwise direction as viewed in FIG. 8 and further assuming that the arcuate notch 110 is in such a position that light rays reflected from the left hand mirror 65 to the prism 60 are again reflected through the arcuate notch 110, through the lens system 30 and into the lenticular screen 176, these light rays from the left hand mirror 65 will continue to be transmitted in this manner until such time as the shutter 92 has rotated a sufficient distance to move the arcuate notch 110 out of the path of light rays reflected from the prism 60 and move the arcuate slot 109 into position to permit passage of light rays reflected from the right hand mirror 63 to the opposite side of the prism 60 and thereafter through the arcuate slot 109. The light rays transmitted from the left hand mirror 65 to the lenticular screen 176 will be converged by the individual lenticles 188 and focused upon the film 189 as a series of spaced parallel lines of light, and due to the fact that immediately upon the arcuate notch 110 of the shutter 92, moving to a position permitting passage of light rays from the left hand mirror 65, the lenticular screen 176 will commence its excursion by reason of the action of cam 177 rotating with shutter shaft 87 and engaging the cam follower 156. This movement of the lenticular screen 176 results in traversing the spaced parallel light lines across a portion of the film 189 with consequent exposure of the emulsion on the surface 190.

Assuming the width of each lenticle to be .0052 inch the length of each arcuate notch and slot in the shutter 92 will be the equivalent of one-half the width of each lenticle. However, due to the time required for proper exposure of the emulsion on the film 189 the excursion of the lenticular screen 176 during movement of one notch or slot past the prism 60 will be slightly greater than one-half the width of each lenticle for instance, .003 inch. This means that while light rays are being transmitted from the left hand mirror 65 to the lenticular screen 176 that the light line appearing on the film 189 will be moved across such film to expose the same, resulting in the reproduction of a plurality of spaced parallel left hand images as shown by the stippled portion in FIG. 22, and by the portions marked L in FIG. 24. Upon the light line reaching the midpoint in its travel, the arcuate notch 110 in the shutter 92 moves beyond the prism 60 to cut off light rays reflected from the left hand mirror 65 and the arcuate slot 109 moves into position to permit passage of light rays from the right hand mirror 63. Continued sliding movement of the lenticular screen 176 results in formation of a plurality of spaced parallel right hand images on the film 189, these right hand images exactly filling the spaces between the previously formed left hand images. This results in a complete photograph composed of alternate left and right hand contiguous images as shown in FIG. 24, each adjacent pair of left and right hand images occupying a space on the film 189 equal to the length of one lenticle 188 of the lenticular screen 176.

It will therefore, be apparent that complete movement of the lenticular screen in one direction results in the complete exposure of one frame of the film 189 providing a plurality of alternate left and right abutting images as described above and upon completion of such movement of the lenticular screen 176 the film feeding mechanism 185 will advance the film 189 one frame and return movement of the lenticular screen 176 by reason of the action of leaf spring 157 will result in the reproduction of right and left hand images in the reverse order on the next frame of the film 189. The relationship of the right and left hand images on adjacent frames of the film 189 is shown in FIG. 23.

The process described above and the operation of the described apparatus results in the provision of a single motion picture film in which each frame is composed of a plurality of contiguous alternate right and left hand images, and the next frame is composed of a plurality of contiguous alternate right and left hand images exposed in the reverse order and with the right and left hand images in one frame in exact alignment with the right and left hand images respectively in the next frame. This film may be projected to provide three dimensional motion pictures by the simple expedient of utilizing a conventional motion picture projector which projects an image from the film to a lenticular screen having the same number of lenticles as the lenticular screen in the camera with which the film was exposed the lenticular screen to which the image is projected being designed for the particular theater or other location in which the viewing audience is assembled, in order to eliminate any possible blank spots it being entirely feasible to so design such a projection screen that any existing blank spots will be so located as to coincide with the aisles or other unoccupied parts of the theater or other location.

Obviously the reciprocating movement of the lenticular screen must be in exact synchronism with the rotation of the rotary shutter and furthermore, the shutter must be so oriented that cut-off of the arcuate notches and slots therein occurs at both ends and the midpoint of the travel of the lenticular screen. This results in the reproduction of perfect stereoscopic images on the film and when projected to a properly designed lenticular screen will result in the provision of perfect three dimensional motion pictures.

In the view of the fact that the outer edges 112 and 113 of the arcuate slots 108 and 109 are curved and of the same radius as the inner edges 114 and 115 of the arcuate notches 110 and 111, and further in view of the fact that as shown in FIG. 20 these edges are in substantial alignment with the apex 61 of the prism 60, portions of the prism at each side of the point of tangency on one side of the prism will be exposed and on the opposite side of the prism will be covered. This results in a somewhat unbalanced transmission of light rays from the prism through the shutter to the remainder of the optical system and consequently if desired in order to at least partially compensate for this condition, the shutter 92 may be formed in such a manner that the inner edges 114 and 115 of the arcuate notches 110 and 111 are formed by a plurality of tangentially disposed flat surfaces 191 and the outer edges of the arcuate slots 112 and 113 are formed by tangentially disposed flat surfaces 192.

These surfaces 191 and 192 may be of almost any desired length and number and in fact may, if desired, form serrated or scalloped edges. The high points 193 and 194 separating the flat surfaces 191 and 192 provide intermittent interruption and consequent diffusion of the light rays passing from the prism 60 to the objective lens system 30 and in this manner, tend to eliminate any sharp line appearing on the film due to leakage of light through the exposed portions of the prism.

This condition may further be alleviated by rendering a portion of the prism 60 at each side of the apex 61 thereof opaque. This may be accomplished by attaching a strip of opaque tape to the prism or by applying opaque paint thereto and as shown in FIG. 20 the opaque portions 195 and 196 on each side of the apex 61 of the prism 60 will serve to further reduce the surface of the prism exposed by the curvature of the shutter 92.

While the form of shutter first described above having uniformly curved edges on the arcuate slots and notches provides an operable device it may prove desirable to utilize the modified form of shutter just described.

Also if desired, the prism 60 may be replaced by a bar type reflector which is shown in FIGS. 6 and 7. This reflector may well comprise four triangular elements 197, 198, 199, and 200 of glass, transparent plastic or other suitable material and cemented together to form a rectangular solid as shown in FIGS. 6 and 7, with the abutting faces provided with alternate silvered or reflecting surfaces 201 and transparent surfaces 202. Such a reflector may, with appropriate adjustments be substituted for the prism 60 with the operation of the apparatus remaining the same as that described above.

A further important feature of the invention resides in the fact that the rotary shutter 92 is located forwardly of the objective lens system 30. This means that the right and left hand images are separated prior to passing through the lens system 30. Such a separation of images after passing through the lens system 30 would be impossible since there would be no way of distinguishing between the images transmitted by the right and left hand mirrors. With the shutter 92 located between the prism 60 and the objective lens system 30 complete separation is obtained resulting in clearly defined separate right and left hand images on the film.

It will be seen that by the above described invention there has been provided an apparatus for producing a film which may be utilized for projecting three dimensional motion pictures, this apparatus constituting a single camera in which a single film is exposed, such film being projected from a single projector to a specially designed screen located in the theater or other viewing location. The mechanism necessary for carrying out the principles of this invention may be incorporated in a conventional motion picture camera without excessive modification thereof and the film may be utilized for projection purposed without in any way modifying the conventional projecting apparatus.

It is further to be noted that the principles of this invention may find wide application in fields other than motion pictures, it only being necessary that a light sensitive surface be located at the critical focus of the lenticular screen. This of course, indicates that the principles of the invention may be applied to television cameras but obviously appropriate modification of such cameras must be made. However, since these other diversified applications of the above described principles form no part of the instant invention, further description thereof is not believed necessary or desirable.

It will be obvious to those skilled in the art that various changes may be made in the invention without departing from the spirit and scope thereof, and therefore the invention is not limited by that which is shown in the drawing and described in the specification, but only as indicated in the appended claims.

What is claimed is:

1. In a three dimensional motion picture system a camera for recording a plurality of contiguous alternate right and left and left and right images on adjacent frames of a sensitzied film, said camera including a film magazine, film feeding means, a focusing objective lens system rotatably mounted for movement from a focusing position to a film exposing position, a rotatable shaft mounted in said camera and extending forwardly thereof adjacent said lens, a shutter mounted on said shaft for rotation in front of said lens, an arcuate slot in said shutter followed by an arcuate notch in the periphery thereof, a second arcuate notch followed by a second arcuate slot substantially diametrically opposite said first slot and notch, the outer edges of said slots being of substantially the same radius as the inner edges of said notches and being in substantial alignment with the axis of said lens, a prism mounted in front of said shutter with the apex thereof in a plane substantially coinciding with the outer and inner edges of said slots and notches respectively, a right hand plane mirror slidably mounted on one side of said prism, a left hand plane mirror slidably mounted on the opposite side of said prism, right and left hand screw threaded means for simultaneously moving said mirrors toward or away from said prism, means for adjusting the angularity of said mirrors, said right hand mirror and said prism serving to transmit light rays from a scene to be photographed through said slots to said lens, said left hand mirror and said prism serving to transmit light rays from said scene through said notches to said lens, the rotation of said shutter resulting in the transmission of light rays in the order of right, left, left, right, a lenticular screen slidably mounted to the rear of said lens system for horizontal reciprocating movement, the lenticles of said screen being disposed vertically, a cam on said shaft for reciprocating said screen substantially the width of one lenticle during one revolution of said shaft and a sensitized film disposed rearwardly of said screen in focus therewith, whereby light rays from the right hand mirror will pass through said slots and each lenticle and due to the movement of said screen reproduce a plurality of horizontally spaced right hand images on said film and light rays from the left hand mirror will pass through said notches and each lenticle and due to continued movement of said screen in the same direction reproduce a plurality of horizontally spaced left hand images on said film between said right hand images the edges of adjacent images coinciding and the right and left hand images on adjacent frames of said film being reproduced in reverse order, the rotation of said shutter, the reciprocation of said lenticular screen and the operation of said film feeding means being in timed relation.

2. In a three dimensional motion picture system a camera for recording a plurality of contiguous alternate right and left and left and right images on adjacent frames of a sensitized film, said camera including a film magazine, film feeding means, a focusing objective lens system rotatably mounted for movement from a focusing position to a film exposing position, a rotatable shaft mounted in said camera and extending forwardly thereof adjacent said lens, a shutter mounted on said shaft for rotation in front of said lens, an arcuate slot in said shutter followed by an arcuate notch in the periphery thereof, a second arcuate notch followed by a second arcuate slot substantially diametrically opposite said first slot and notch, the outer edges of said slots being of substantially the same radius as the inner edges of said notches and being in substantial alignment with the axis of said lens, a prism mounted in front of said shutter with the apex thereof in a plane substantially coinciding with the outer and inner edges of said slots and notches respectively, a right hand mirror slidably mounted on one side of said prism, a left hand mirror slidably mounted on the opposite side of said prism, means for simultaneously moving said mirrors toward or away from said prism, means for adjusting the angularity of said mirrors, said right hand mirror and said prism serving to transmit light rays from a scene to be photographed through said slots to said lens, said left hand mirror and said prism serving to transmit light rays from said scene through said notches to said lens, the rotation of said shutter resulting in the transmission of light rays in the order of right, left, left, right, a lenticular screen slidably mounted to the rear of said lens system for horizontal reciprocating movement, the lenticles of said screen being disposed vertically, a cam on said shaft for reciprocating said screen substantially the width of one lenticle during one revolution of said shaft and a sensitized film disposed rearwardly of said screen in focus therewith, whereby light rays from the right hand mirror will pass through said slots and each lenticle and due to the movement of said screen, reproduce a plurality of horizontally spaced right hand images on said film and light rays from the left hand mirror will pass through said notches and each lenticle and due to continued movement of said screen in the same direction reproduce a plurality of horizontally spaced left hand images on said film between said right hand images, the edges of adjacent images coinciding and the right and left hand images on adjacent frames of said film being reproduced in reverse order, the rotation of said shutter, the reciprocation of said lenticular screen and the operation of said film feeding means being in timed relation.

3. In a three dimensional motion picture system a camera for recording a plurality of contiguous alternate right and left and left and right images on adjacent frames of a sensitized film, said camera including a film magazine, film feeding means, an objective lens system, a rotatable shaft mounted in said camera and extending forwardly thereof adjacent said lens, a shutter mounted on said shaft for rotation in front of said lens, an arcuate slot in said shutter followed by an arcuate notch in the periphery thereof, a second arcuate notch followed by a second arcuate slot substantially diametrically opposite said first slot and notch, the outer edges of said slots being of substantially the same radius as the inner edges of said notches, and being substantially in alignment with the axis of said lens, a prism mounted in front of said shutter with the apex thereof substantially in alignment with the axis of said lens, a right hand mirror slidably mounted on one side of said prism, a left hand mirror slidably mounted on the opposite side of said prism, means for simultaneously moving said mirrors toward or away from said prism, means for adjusting the angularity of said mirrors, said right hand mirror and said prism serving to transmit light rays from a scene to be photographed through said slots to said lens, said left hand mirror and said prism serving to transmit light rays from said scene through said notches to said lens, the rotation of said shutter resulting in the transmission of light rays in the order of right, left, left, right, a lenticular screen slidably mounted to the rear of said lens system for horizontal reciprocating movement, the lenticles of said screen being disposed vertically, a cam on said shaft for reciprocating said screen substantially the width of one lenticle during one revolution of said shaft and a sensitized film disposed rearwardly of said screen in focus therewith, whereby light rays from the right hand mirror will pass through said slots and each lenticle and due to the movement of said screen, reproduce a plurality of horizontally spaced right hand images on said film and light rays from the left hand mirror will pass through said notches and each lenticle and due to continued movement of said screen in the same direction reproduce a plurality of horizontally spaced left hand images on said film between said right hand images, the edges of adjacent images coinciding and the right and left hand images on adjacent frames of said film being reproduced in reverse order, the rotation of said shutter, the reciprocation of said lenticular screen and the operation of said film feeding means being in timed relation.

4. In a three dimensional motion picture system a camera for recording a plurality of contiguous alternate right and left and left and right images on adjacent frames of a sensitized film, said camera including a film magazine, film feeding means, an objective lens system, a rotatable shaft mounted in said camera and extending forwardly thereof adjacent said lens, a shutter mounted on said shaft for rotation in front of said lens, a slot in said shutter followed by a notch in the periphery thereof, a second notch followed by a second slot substantially diametrically opposite said first slot and notch with the outer edges of said slots and the inner edges of said notches being substantially in alignment with the axis of said lens, a prism mounted in front of said shutter with the apex thereof substantially in alignment with the axis of said lens, a right hand mirror slidably mounted on one side of said prism, a left hand mirror slidably mounted on the opposite side of said prism, means for moving said mirrors toward or away from said prism, means for adjusting the angularity of said mirrors, said right hand mirror and said prism serving to transmit light rays from a scene to be photographed through said slots to said lens, said left hand mirror and said prism serving to transmit light rays from said scene through said notches to said lens, the rotation of said shutter resulting in the transmission of light rays in the order of right, left, left, right, a lenticular screen slidably mounted to the rear of said lens system for horizontal reciprocating movement, the lenticles of said screen being disposed vertically, a cam on said shaft for reciprocating said screen and a sensitized film disposed rearwardly of said screen in focus therewith, whereby light rays from the right hand mirror will pass through said slots and each lenticle and due to the movement of said screen, reproduce a plurality of horizontally spaced right hand images on said film and light rays from the left hand mirror will pass through said notches and each lenticle and due to continued movement of said screen in the same direction reproduce a plurality of horizontally spaced left hand images on said film between said right hand images, the edges of adjacent images coinciding and the right and left hand images on adjacent frames of said film being reproduced in reverse order, the rotation of said shutter, the reciprocation of said lenticular screen and the operation of said film feeding means being in timed relation.

5. In a three dimensional motion picture system a camera for recording a plurality of contiguous alternate right and left and left and right images on adjacent frames of a sensitized film, said camera including a film magazine, film feeding means, an objective lens system, a rotatable shaft mounted in said camera and extending forwardly thereof, a shutter mounted on said shaft for rotation in front of said lens, a slot in said shutter followed by a notch in the periphery thereof, the outer edge of said slot and the inner edge of said notch being substantially in alignment with the axis of said lens, a prism mounted in front of said shutter with the apex thereof substantially in alignment with the axis of said lens, a right hand mirror movably mounted on one side of said prism, a left hand mirror movably mounted on the opposite side of said prism, said right hand mirror and said prism serving to transmit light rays from a scene to be photographed through said slot to said lens, said left hand mirror and said prism serving to transmit light rays from said scene through said notch to said lens, a lenticular screen reciprocably mounted to the rear of said lens system, means on said shaft for reciprocating said screen and a sensitized film disposed rearwardly of said screen in focus therewith whereby light rays from the right hand mirror will pass through said slot and each lenticle and due to the movement of said screen reproduce a plurality of spaced right hand images on said film and light rays from the left hand mirror will pass through said notch and each lenticle and due to continued movement of said screen in the same direction reproduce a plurality of spaced left hand images on said film between said right hand images, the rotation of said shutter, the reciprocation of said lenticular screen and the operation of said film feeding means being in timed relation.

6. In a three dimensional motion picture system a camera for recording a plurality of contiguous alternate right and left and left and right images on adjacent frames of a sensitized film, said camera including a film magazine, film feeding means, an objective lens system, a rotatable shaft mounted in said camera and extending forwardly thereof, a shutter mounted on said shaft for rotation in front of said lens, a slot in said shutter followed by a notch in the periphery thereof, the outer edge of said slot and the inner edge of said notch being substantially in alignment with the axis of said lens, reflecting means mounted in front of said shutter in substantial alignment with the axis of said lens, a right hand mirror movably mounted on one side of said reflecting means, a left hand mirror movably mounted on the opposite side of said reflecting means, said right hand mirror and said reflecting means serving to transmit light rays from a scene to be photographed through said slot to said lens, said left hand mirror and said reflecting means serving to transmit light rays from said scene through said notch to said lens, a lenticular screen reciprocably mounted to the rear of said lens system, means for reciprocating said screen and a sensitized film disposed rearwardly of said screen in focus therewith whereby light rays from the right hand mirror will pass through said slot and each lenticle and due to the movement of said screen reproduce a plurality of spaced right hand images on said film and light rays from the left hand mirror will pass through said notch and each lenticle and due to continued movement of said screen in the same direction reproduce a plurality of spaced left hand images on said film between said right hand images.

7. A camera for exposing sensitized film capable of use in projecting three dimensional motion pictures, said camera including an objective lens system, a mirror for viewing a scene to be photographed from the right side, a mirror for viewing said scene from the left side, a prism with the apex thereof substantially in alignment with the axis of said lens disposed between said mirrors for receiving right and left hand images therefrom and transmitting said images to said lens system disposed behind said prism, a rotary shutter disposed between said prism and said lens system for separating said right and left hand images prior to passing through said lens system and a reciprocating lenticular screen disposed behind said lens system in alignment therewith, each lenticle of said screen projecting right and left hand images to adjacent portions of said film to provide a plurality of contiguous alternate right and left hand images on one frame of said film.

8. A camera for exposing sensitized film capable of use in projecting three dimensional motion pictures said camera including an objective lens system, means for viewing a scene to be photographed from the right side, means for viewing said scene from the left side, reflecting means substantially in alignment with the axis of said lens and disposed between said means for receiving right and left hand images therefrom and transmitting said images to said lens system, means disposed between said reflecting means and said lens system for separating said right and left hand images prior to passing through said lens system and a reciprocating lenticular screen disposed behind said lens system in alignment therewith, each lenticle of said screen projecting right and left hand images to adjacent portions of said film to provide a plurality of contiguous alternate right and left hand images on one frame of said film.

9. Apparatus as defined in claim 4 in which said mirrors are pivotally mounted on slides and the means for adjusting the angularity of said mirrors comprises an arm secured to each mirror and extending forwardly, a sleeve pivotally secured to the forward end of each arm, a rod slidably received in each sleeve, a set screw in each sleeve for locking each rod against movement relative thereto, a left hand thread on the inner end of one rod, a right hand thread on the inner end of the other rod, an elongated nut rotatably mounted on said camera and fixed against longitudinal movement, a finger engaging portion on said nut and right and left hand threads in opposite ends of said nut engaging the right and left hand threads in opposite ends of said rods whereby upon rotation of said nut the angularity of said mirrors will be varied and upon release of said set screws said mirrors may be moved toward or from each other while maintaining the same angular position.

10. Apparatus as defined in claim 4 in which said mirrors are pivotally mounted on slides and the means for adjusting the angularity of said mirrors comprises an arm secured to each mirror, a rod slidably attached to each arm, means for locking each rod against movement relative to each arm and means to simultaneously move said rods toward or away from each other whereby the angularity of said mirrors will be varied and upon release of said locking means said mirrors may be moved toward or from each other while maintaining the same angular position.

References Cited in the file of this patent

UNITED STATES PATENTS

| | | |
|---|---|---|
| 1,451,325 | Comstock et al. | Apr. 10, 1923 |
| 1,457,500 | Comstock | June 5, 1923 |
| 1,525,346 | Warren | Feb. 3, 1925 |
| 1,537,315 | Lang | May 12, 1925 |
| 1,851,705 | Herz | Mar. 29, 1932 |
| 1,984,004 | Wildhaber | Dec. 11, 1934 |
| 2,040,280 | Strecker | May 12, 1936 |
| 2,150,932 | McDonnell | Mar. 21, 1939 |
| 2,225,747 | Landrock | Dec. 24, 1940 |
| 2,351,032 | Gabor | June 13, 1944 |
| 2,501,258 | Bonnet | Mar. 21, 1950 |
| 2,627,199 | O'Brien | Feb. 3, 1953 |
| 2,644,382 | Ayres | July 7, 1953 |
| 2,689,502 | Ayres | Sept. 21, 1954 |

FOREIGN PATENTS

| | | |
|---|---|---|
| 491,578 | Great Britain | Nov. 30, 1936 |
| 610,515 | Great Britain | Oct. 18, 1948 |
| 733,202 | France | July 4, 1932 |
| 976,049 | France | Oct. 25, 1950 |